Figure 1:
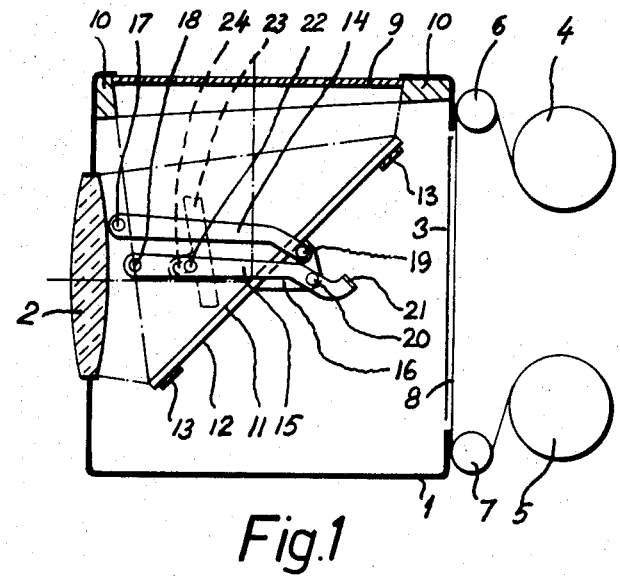

United States Patent
Alfredsson

[15] 3,698,305
[45] Oct. 17, 1972

[54] VIEWFINDER MIRROR MECHANISM FOR SINGLE-LENS REFLEX

[72] Inventor: Alf Ingva Alfredsson, Savedalen, Sweden

[73] Assignee: Dr. Fritz Victor Hasselblad, Goteborg, Sweden

[22] Filed: Dec. 10, 1970

[21] Appl. No.: 96,742

[52] U.S. Cl. .................................................. 95/42
[51] Int. Cl. ............................................. G03b 19/12
[58] Field of Search ........................................ 95/42

[56] References Cited

UNITED STATES PATENTS

| | | | |
|---|---|---|---|
| 2,949,073 | 8/1960 | Weiss | 95/42 |
| 3,532,044 | 10/1970 | Shimomura | 95/42 |
| 3,468,232 | 9/1969 | Knapp | 95/42 |
| 3,540,365 | 11/1970 | Ishizaka | 95/42 |

FOREIGN PATENTS OR APPLICATIONS

| | | |
|---|---|---|
| 877,542 | 7/1949 | Germany |
| 165,916 | 3/1959 | Sweden |

Primary Examiner—Samuel S. Matthews
Assistant Examiner—E. M. Bero
Attorney—Sommers & Young

[57] ABSTRACT

A viewfinder mirror mechanism for one-piece, single-lens reflex cameras in which three or four arms have one end pivotally attached to the sides of the camera and their other ends pivotally attached to lateral edges of the mirror and the pivot points are selected so that movement of the mirror between a folded-down and a folded-up position causes the edge of the mirror adjacent the lens to describe an extended S-shaped curve which curves away from the lens until the mirror clears the lens area and then curves toward the lens in the area above the lens area.

2 Claims, 2 Drawing Figures

VIEWFINDER MIRROR MECHANISM FOR SINGLE-LENS REFLEX

This invention relates to a viewfinder mirror mechanism for single-lens reflex cameras, at which the viewfinder mirror is suspended in three or four hinged arms secured in the lateral edges of the viewfinder mirror and in the camera body, respectively. The mounting points of the hinged arms are so chosen that upon movement of the viewfinder mirror between folded-down and folded-up position, or vice versa, the viewfinder mirror edge facing the lens describes a curve of extended S-shape, which curve with its lower part bulges away from the lens and with its upper part towards the lens. Hereby the view finder mirror runs free of the lens projecting inwardly into the camera body, with the exception of single lenses of wide-angle type which project inwardly to the viewfinder mirror such a distance that in these cases the mirror must be maintained in folded-up position and instead an external viewfinder must be used. The construction comprising three or four hinged arms provides the viewfinder mirror with a controlled movement and eliminates the need of additional control means in the form of guide curves or tooth sectors as found in conventional constructions comprising a pair of hinges formed as one uniform bow.

The viewfinder mirror in a single-lens reflex camera must be movable for being able during the exposure to be swung out of the ray path of the lens. In folded-down position the mirror has to show an uncurtailed image of the object on the ground-glass screen of the camera, and in folded-up position it has to cover the ground-glass screen so that no light from the viewfinder can penetrate into the camera. The minimum dimensions of the viewfinder mirror and its positions in folded-down and, respectively, folded-up state are, thus, given.

The most simple conventional means for folding the viewfinder mirror upwards and downwards is that means at which the viewfinder mirror pivots about a pair of hinge pins in the rear edge of the mirror holder, and the front edge moves along the arc of a circle bulging towards the lens. The possibilities of utilizing this simple and reliable means, however, are very restricted. At system cameras with a series of interchangeable lenses having varying focal lengths, the fact is that the rear part of most lenses projects such a distance into the camera body that when said hinge means is used the viewfinder mirror is unable to run free of the lens.

When one does not want to use a shortened viewfinder mirror, which would show a curtailed mirror image, then remains the possibility of designing the viewfinder mirror mechanism in such a way, that the viewfinder mirror moves in a path allowing the mirror to run free of the rear edge of the lens. A study of the distance through which the viewfinder mirror has to be moved away from the interchangeable lens in question so as to run free shows, that this distance is relatively short for most of the lenses in a usual set of interchangeable lenses. Exemptions usually are wide-angle lenses, which project an exceptionally long distance into the camera body. A viewfinder mirror, in order to run free of all interchangeable lenses in the set, must move with its edge facing the lens along a curve with a strong curvature. Conventional constructions with both divided and one-piece viewfinder mirrors are necessarily relatively complicated and space requiring. This disadvantage is particularly troublesome for cameras with a negative size of 6 × 6 cm and larger, because hereby the camera has to be given such dimensions that it will be difficult to hold and release it as usual with one hand, and to have the other hand free for setting the distance, the diaphragm, the shutter speed etc. The advantages of being able to utilize the viewfinder mirror for all lenses do not compensate for the disadvantages of a complicated and space-requiring viewfinder mirror mechanism. At another conventional construction one has made a compromise, which implies that the view finder mirror can be utilized for all interchangeable lenses in the set except for that or those projecting farthest into the camera body. When photographing with these latter lenses, the viewfinder mirror is maintained in folded-up position and instead some kind of external viewfinder is used. In this case, the shape of the curve along which the viewfinder mirror edge facing the lens must move for running free of the lens, is much more flat and, consequently, the viewfinder mirror mechanism can be given a much simpler and above all less space requiring design. The camera, thus, can be given smaller dimensions and will be easier to handle. This advantage compensates more than well for the disadvantage of having to use an external viewfinder at those relatively few occasions of photographing with a lens projecting a long distance into the camera body.

At known constructions of the latter preferred type of viewfinder mirror mechanism, the viewfinder mirror is suspended at a pair of hinged arms. Said arms have their mounting points in the lateral edges of the camera body and, respectively, in the edges of the viewfinder mirror holder. A viewfinder mirror suspended in this way and adapted to pivot freely about the suspension points located on both sides, requires some kind of additional control for enabling the viewfinder mirror edge facing the lens to follow the aforedescribed curve of extended S-shape. For this purpose guide curves as well as constructions with tooth sectors have been used. These controls solutions involve the disadvantages of either giving rise to a diagonal pull, the so-called "chest drawer phenomenon," with resulting unreliable function, or of being unnecessarily complicated.

The aforementioned disadvantages are avoided by a viewfinder mirror mechanism for single-lens reflex cameras according to the invention, which provides a simple, reliable and light-weight construction, which requires little space in the camera body. The control of the viewfinder mirror is effected such, that the aforementioned guide curves or tooth sectors have been replaced by one or two extra hinged arms, so that the viewfinder mirror is suspended in three or four hinged arms. A viewfinder mirror suspended in this way performs a controlled movement when it is being folded up or down. By a suitable choice of the mounting points of the hinged arms in control camera body and on the holder of the viewfinder mirror, the forward edge of the viewfinder mirror can be caused to follow the aforementioned curve with extended S-shape, so that said edge runs free of the rear edge of the lens.

Figure 2:
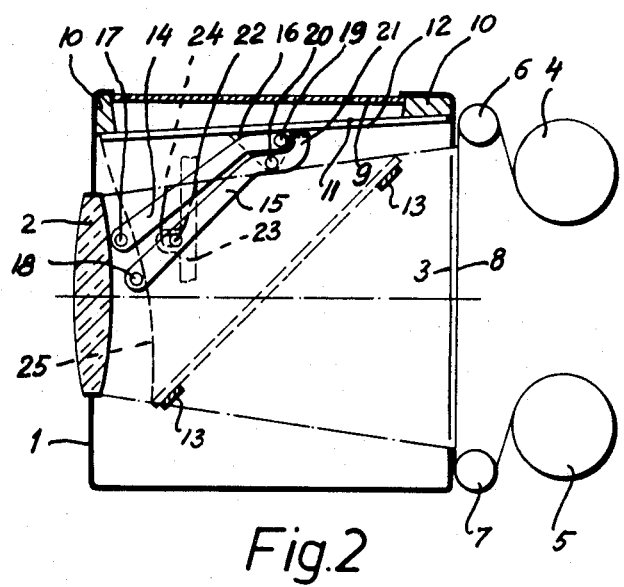

A preferred embodiment of the invention is described in the following in greater detail, with reference to the accompanying drawing in which FIG. 1 is a schematic plane view of a single-lens reflex camera with the viewfinder mirror in folded-down position, and FIG. 2 is a corresponding view with the viewfinder mirror in folded-up position.

In the front side of a camera body 1, FIGS. 1 and 2, a lens assembly is located, the rear lens 2 of which with associated lens mount projects some distance into the camera body 1. In the rear wall of the camera body a gate 3 is provided behind which the film 8 is pulled ahead from a lower film bobbin 5 via guide pulleys 7, 6 to an upper film bobbin 4. The upper surface of the camera body 1 is covered by a ground-glass screen 9 having the same size as the gate 3. Below the ground-glass screen 9 a sealing frame 10 is located.

The viewfinder mirror mechanism comprises a viewfinder mirror 11 resting in a viewfinder mirror holder 12, which is movably suspended in two pairs of hinged arms 14 and 15, respectively. The viewfinder mirror holder 12 has on each lateral edge an eye 16 with two journals 19, 20 for the upper 14 and, respectively, lower 15 hinged arms, which with their other ends are mounted in the side surfaces of the camera body 1 on journals 17 and 18, respectively. For obtaining a good parallel guidance of the viewfinder mirror 11 at its movement between folded-up and folded-down position, or vice versa, the lower hinged arms 15 are extended slightly in rearward direction and connected by a transverse bar 21 to form a rigid bracket. The hinged arms 14, 15 are curved at their portions facing the viewfinder mirror 11 so as to run free from each other when the viewfinder mirror 11, FIG. 2, is in folded-up position. The bar 21 can be given straight or some other (not shown) shape. In folded-down position, FIG. 1, the movement of the viewfinder mirror holder 12 is restricted by stationary supports 13 mounted on the side walls of the camera body 1. In folded-up position, FIG. 2, the viewfinder mirror 11 presses against the sealing frame 10 so that no light from the viewfinder can penetrate into the camera body 1 and damage the film 8. The viewfinder mirror mechanism is operated by a driving and controlling means, which is of no concern to this invention. This means comprises a control rod 23 with a groove 24, which embraces a carrier pin 22 on one of the lower hinged arms 15.

In order to obtain a full viewfinder image by the lens on the ground-glass screen, the viewfinder mirror 11 must be given a length exceeding considerably that of the ground-glass screen 9, as shown in FIG. 1 where the edge rays from the lens are drawn by dash-dotted lines. Assuming this viewfinder mirror 11 being pivotally suspended about its edge remote from the lens, which is a simple and usual construction, the mirror edge facing the lens will move along an arc of a circle bulging towards the lens, which arc intersects the end of the lens. Hereby this kind of viewfinder mirror mechanism is rendered impossible in the present case. At a viewfinder mirror mechanism according to the invention this lastmentioned edge will instead move along a curve 25 indicated by a dashed line (FIG. 2). This curve with its lower part bulges away from the lens to a relatively large degree required for allowing the viewfinder mirror 11 to run free, and with its upper part where there is space available the curve bulges more slightly towards the lens. For being able to make maximum use of this effect at the hinge mechanism shown, the viewfinder mirror 11 is maintained against the sealing frame 10 before it arrives at a position in parallel with the ground-glass screen 9, but outside the ray path of the lens. The edge of the viewfinder mirror 11 which is remote from the lens describes a more complicated curve of a stronger curvature, for which is sufficient room in the space shown. The curve is not described here in detail as it is of no concern to the object of the invention. In order to fit the individual camera construction the shape of the curve 25 can be modified within reasonable limits by a suitable choice of the positions for the journals 17, 19 and 18, 20, respectively, of the hinged arms 14, 15.

The invention is not restricted to the embodiment shown. It may be varied as to its details without abandoning the basic idea of the invention. The desired control of the viewfinder mirror, for example, can be effected by only three hinged arms, in which case preferably one of the upper hinged arms 14 is abolished.

I claim:

1. A viewfinder mechanism for single-lens reflex cameras having a one-piece viewfinder mirror which moves between a folded-down and a folded-up position in order to move free of a lens projecting into the camera body; comprising, a mirror holder; a pair of downwardly projecting tabs mounted on the lateral edges of said holder adjacent the center of said holder; a first pair of pivot means one on each of said tabs; a pair of lower arms each having one end pivotally mounted on one of said first pivot means with a portion of said one end extending beyond said first pivot means; bar means behind said holder joining the extended ends of said lower arms; a second pair of pivot means on a portion of the side walls of said camera body adjacent the lens having the other ends of said lower arms pivotally mounted thereon; at least one third pivot means on said tabs between said first pivot means and said holder; at least one upper arm having one end pivotally mounted on said third pivot means; at least one fourth pivot means on the forward portion of at least one side wall of said camera body above said second pivot means having the other end of said upper arm pivotally mounted thereon; said first, second, third and fourth pivot means being located relative to one another such that the edge of said mirror adjacent said lens is confined to move in such a manner that a point on said mirror describes an S-shaped curve, curving away from said lens in the area of said lens and then curving toward said lens in the area above said lens area.

2. A viewfinder mechanism in accordance with claim 1 wherein the third and fourth pivot means are each a pair of pivots and there is a pair of upper arms each attached to one of said pivots of both said third and fourth pivots means.

* * * * *

PO-1050
(5/69)

UNITED STATES PATENT OFFICE
CERTIFICATE OF CORRECTION

Patent No. 3,698,305            Dated October 17, 1972

Inventor(s) Alf Ingva Alfredsson

It is certified that error appears in the above-identified patent and that said Letters Patent are hereby corrected as shown below:

Foreign Application Priority Date

June 15, 1970    Sweden........................8252/70

Signed and sealed this 13th day of February 1973.

(SEAL)
Attest:

EDWARD M. FLETCHER, JR.
Attesting Officer

ROBERT GOTTSCHALK
Commissioner of Patents